United States Patent [19]

Ramirez

[11] 3,901,549
[45] Aug. 26, 1975

[54] CONTOURED CHAP-STYLE CYCLING APRON

[76] Inventor: Richard D. Ramirez, 260 N. Manor Cir., Takoma Park, Md. 20012

[22] Filed: Apr. 12, 1973

[21] Appl. No.: 350,481

[52] U.S. Cl. ............................. 296/78.1; 280/289
[51] Int. Cl. .................................... B62j 17/06
[58] Field of Search ............ 296/78.1, 78; 280/289; 2/1, 2, 22, 46

[56] References Cited
UNITED STATES PATENTS

| | | | |
|---|---|---|---|
| 1,169,888 | 2/1916 | Tulloch | 296/78.1 |
| 3,499,416 | 3/1970 | Thorsheim | 2/1 X |

FOREIGN PATENTS OR APPLICATIONS

| | | | |
|---|---|---|---|
| 340,299 | 5/1936 | Italy | 296/78.1 |
| 1,156,514 | 12/1957 | France | 296/78.1 |

*Primary Examiner*—Kenneth H. Betts
*Attorney, Agent, or Firm*—John E. Becker

[57] ABSTRACT

A novel chap-style protective apron for use by riders of various mechanized vehicles such as motorcycles, motorbikes, snowmobiles, etc. The chap-apron is of weatherproof material and is partially custom-fitted to conform to and overlay the user's knees, upper and lower legs, and lap area. One form provides an integrally formed flap to secure the apron article to the vehicle to deter loss or theft. Another form provides for unique fastening means associated with a saddle-blanket-like portion of the apron for adjustably attaching the apron to the vehicle saddle. The aprons also include provision for light reflective means for purpose of increased safety at night. The inner and outer side flap areas of the article are selectively readily attachable to and detachable from one another generally around each lower leg area preferably by the use of quickly detachable Velcro type fastening means to enable the rider to readily break free of the apron in emergencies.

16 Claims, 8 Drawing Figures

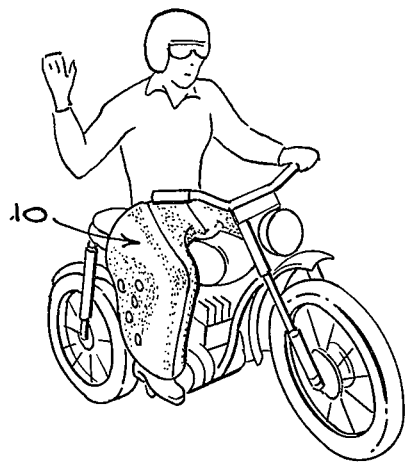
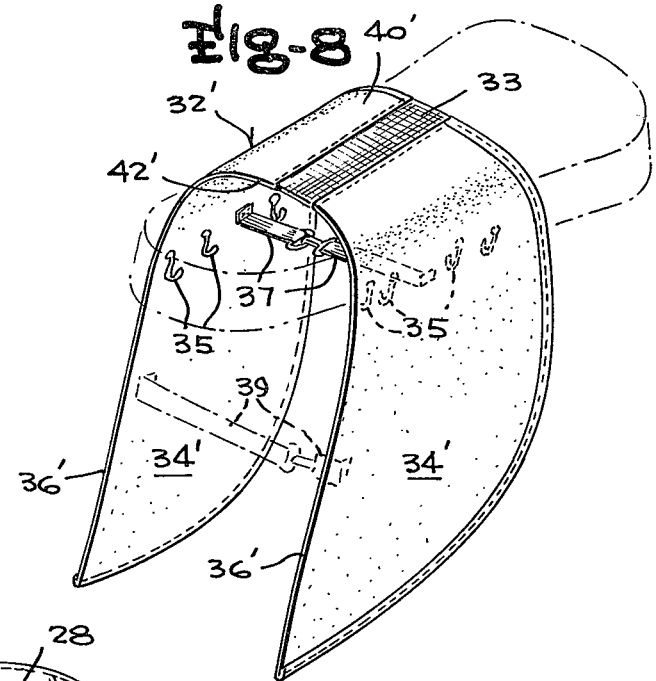

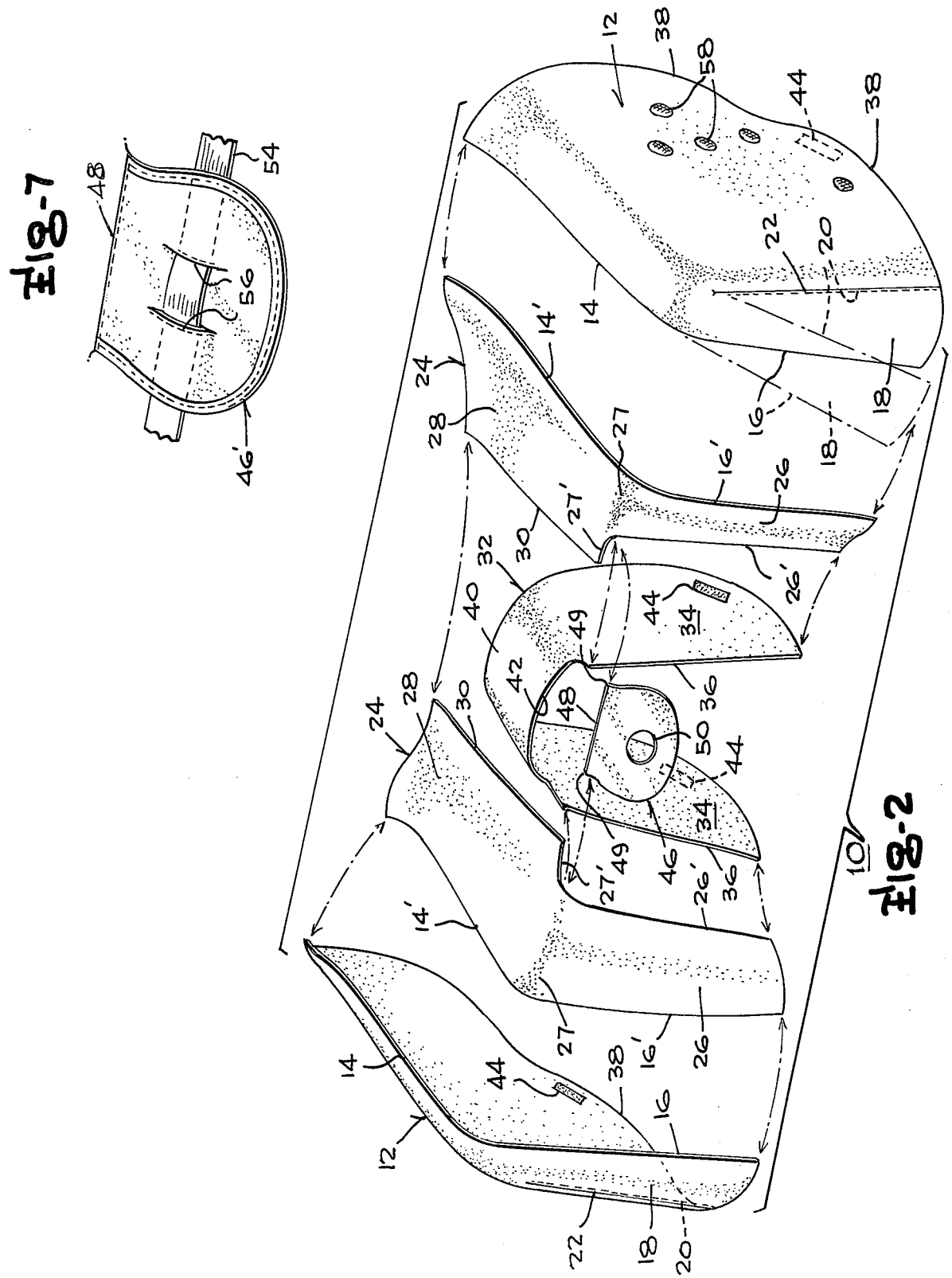

CONTOURED CHAP-STYLE CYCLING APRON

BACKGROUND OF THE INVENTION

The present invention relates generally to a form of cycling apparel and more particularly to a more universally styled, weather-protective, chap style apron for use especially in operating motorcycles, motorbikes, snowmobiles, and other similar mechanized vehicles.

While there have been various articles of rider or cycle apparel developed heretofore, such as various apron-like wind breakers or cycle mounted screens, they have generally not been of a truly operator-body-contoured type. Most of the prior apron-like covers of which I am aware have been of a generally rectangular or semi-circular flexible sheet of water-repellant material which generally lays or is draped loosely across the operator's lap and lower legs while overlaying the center frame and/or tank area of the cycle. These prior art weather-resistant aprons under certain circumstances tend to billow out and become sail-like or flap annoyingly when cycling at moderately fast speeds. This is particularly true when lap robe type aprons are used in association with the crash bars and/or a fixed windscreen on the front of the cycle, resulting in the airstream flowing around and under the apron causing reverse turbulence at the side and back areas of the operator thereby reversely deflecting the conventional lap robe. Furthermore, such prior aprons and/or weather and windscreens were drafty and had to be made in a larger number of different custom-designed variations for use with cycles made by different manufacturers and for different style machines.

Alternatively to the use of aprons or screens, it is common for cyclists to wear necessarily bulky leather or other heavy clothing to protect them against not only the elements, but also against potential injuries normally sustainable attendant accidental skids of the cycle.

Accordingly, it is a principal object of the present invention to provide a novelly improved article of cycling apparel generally more universally applicable for use by operators of motorcylces and other similar mechanized vehicles.

Another object of the invention is to provide a novel, more universally applicable partially body-contoured article of protective apparel of a chap-type apron character which is adaptable to fit in a custom-like manner about the legs and lower body area of the cycle or vehicle operator.

Still another object of the invention is to provide a novel chap-type riding apron of the aforestated character which is adaptable to have one or more portions thereof selectively detachably affixed to the vehicle usually in the area of or beneath the seat or saddle, so that it not only helps to stabilize the apron on the vehicle but also tends to preclude theft or unauthorized borrowing.

A further object is to provide such an article which embodies custom-like contoured portions to overlay the operator's or rider's legs and lower body when in the mounted position without encumbering the feet, and further provision for quick-release attachment of the outer and inner side flaps or lower skirt-like portions to one another to positively secure same in a more protective manner on the wearer.

Yet another object is to provide at least some forms of a protective article of the foregoing charactor which is fabricated of a weather and windproof material of inherently heavy material which would tend to lay relatively stable and to deter and reduce flutter of the exposed side flap portions.

A still further object is to provide an apparel article according to the preceeding objectives which contemplates inclusion of light reflective means integrally with at least certain portions of the apparel article for safety reasons.

BRIEF SUMMARY OF THE INVENTION

These and other objectives and advantages are achievable by fabricating a generally chap-like article of apparel from a plurality of panels of heavy duty, flexible sheet material having inherent water- and windproof characteristics. The article further includes panel formations cooperatively interconnected and contoured to form a pair of rounded apices spaced apart to receive the rider's knees and to otherwise overlay the rider's lap, general waist area and lower leg areas. The panels further include outer and inner leg flap or skirt-like portions of which the opposite inner flap portions are not only unitarily connected along the frontal areas to the outer flap portions, but also are preferably integrally connected to each other by an underseat portion, the latter being connectable with forward medial portions of the lap area to cooperatively form a comfortable crotch area. Rearward portions of the side flap areas are provided with quick-release fasteners, preferably of the Velcro type. These enable the garment or article to be releasably secured around and to essentially fully protectively enclose the legs. In event of emergency or other need to dismount the vehicle in a hurry, pressure exerted by the upper leg portions attendant raising up of the wearer to dismount or toward a standing-like condition, will automatically separate the Velcro-type fasteners, thereby not detrimentally restricting the wearers movements.

Unique crotch flap means or other vehicle saddle-related fastening means are contemplated by which the novel apron hereof can be affixed in various manners and relative positions upon the vehicle.

Outwardly exposed side and/or frontal areas preferably are utilized to exhibit light reflector means such as luminous tape or other reflector means. It is also contemplated that the complete garment or article can be made of a luminous or light reflective material to enhance being seen in darkness.

These foregoing and other objects and advantages will become more apparent to those familiar with this art, from the following detailed description considered in conjunction with the following illustrative drawing figures.

BRIEF DESCRIPTION OF THE DRAWINGS

FIG. 1 is a perspective view of a cycle and cyclist showing the novel chap-type apron in position;

FIG. 2 is an exploded perspective depicting a preferred pattern of panel components used to fabricate the apron article;

FIG. 3 is an enlarged perspective view of the chap-style apron of this invention;

FIG. 7 is a detailed view of an alternate form of the flap member used to secure the apron to the vehicle; and FIG. 8 is a perspective view of a modified saddleblanket panel portion depicting an alternate embodiment.

DETAILED DESCRIPTION OF A PREFERRED EMBODIMENT

Figure 4:
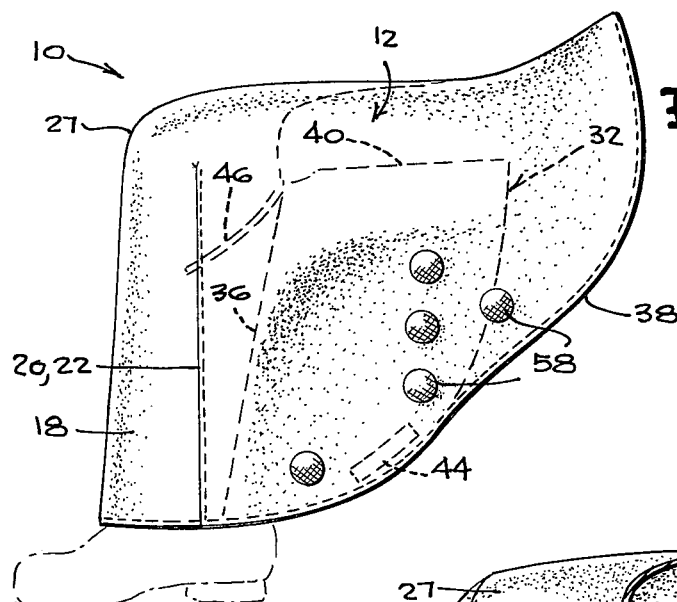
FIG. 4 is a side elevational view of the chap-apron.

Reference will be made in more detail to the illustrative drawings wherin like reference numbers designate like parts throughout the several figures.

The chap-style apron is generally designated 10 and is shown in use upon a motorcycle operator in FIG. 1. FIG. 2 depicts one feasible example of an apron comprised of a plurality of panel components, as shown in exploded relationship. The apron panel components include a pair of generally identical but opposite hand, outermost leg covering flaps or panels 12, 12 of generally quadrant shape when viewed in side elevation. Each panel 12 includes an upper substantially linear edge 14 adapted to lay generally horizontally atop the wearer's leg portion when in the assembled apron. It also includes a generally vertical linear edge 16 coextensive with, but disposed generally 90° relative to edge 14, and adapted to lay generally forwardly adjacent the lower leg of the operator.

The 90° relative disposition of edges 16 and 14 is achieved after a narrow strip portion 18, initially separated by a pie-shape notch from an intermediate vertical edge 20 of the side panel 12, is attached to the side panel, as by a stitched seam 22. This arrangement contributes to the partial forming of a knee-contoured portion.

Apron 10 further preferably includes a second pair of generally identical but opposite hand irregular shaped panel members 24, 24 having edge portions 14' and 16' corresponding and complemental to edges 14 and 16 of each panel 12. Panel members 24 each include an elongated generally rectangular or slightly trapezoidal shaped partial-lower leg portion 26 which is connected integrally along a potential knee-fold area 27 with a greater width generally rectangular or slightly trapezoidal shaped half-lap portion 28. Each half-lap portion 28 has a common linear seam-forming edge 30. The corresponding edges 30, 30 and the generally right angular edge portions 14, 14' and 16, 16' are preferably stitched together forming suitable paneljoining seams. The seam formed by the joined edges 30, 30 generally defines the longitudinal center of the apron 10.

A further elongated flexible panel member, generally designated 32, is of generally saddle or saddle blanket shape and which, in the use condition, completes the basic fabrication of the chap-style apron. Panel 32 constitutes a central under panel member, and includes opposite hand end portions 34 constituting inner lower leg-covering flaps, which have generally linear forward edges 36 corrsponding in length to counterpart edges 26' on the lower leg portions 26 of the panels 24. Opposite the edge 36 of the panel 32 there is a preferably arcuate edge 38 corresponding generally to a lower portion of arcuate outer flap or leg covering panel 12. Edge 38 converges toward and intersects with the lower end of edge 36. Panel 32 further includes a medial seat-engaging portion 40 which integrally interconnects the opposite lower leg-covering flaps 34, 34. A forward linear edge 42 of the medial portion 40 is adjoined with the intermediate edges 27' forming a step connection between edges 26' and 30 of each panel 24. The juncture of the medial portion 40 with the step edges 27' completes the formation of a crotch portion of the apron when the apron is in the use condition.

In order to selectively fasten the outer and inner leg-covering flaps 12 and 34, it is preferred to utilize a quick release or breakaway type of fastening means. Accordingly, in this preferred embodiment, limited length strips or areas of a Velcro type fastener means 44 are attached for face-to-face cooperation on the in-use inside faces of each flap. These are preferably disposed along an intermediate portion of the generally curved peripheral edges of the respective flap members. The provision of such means enables the apron flaps to be positively secured around the leg in a chap-like style, but still enables the wearer to break free quickly in emergencies, particularly when the apron is attached in a rather fixed manner to the vehicle, as will now be described.

Figure 5:
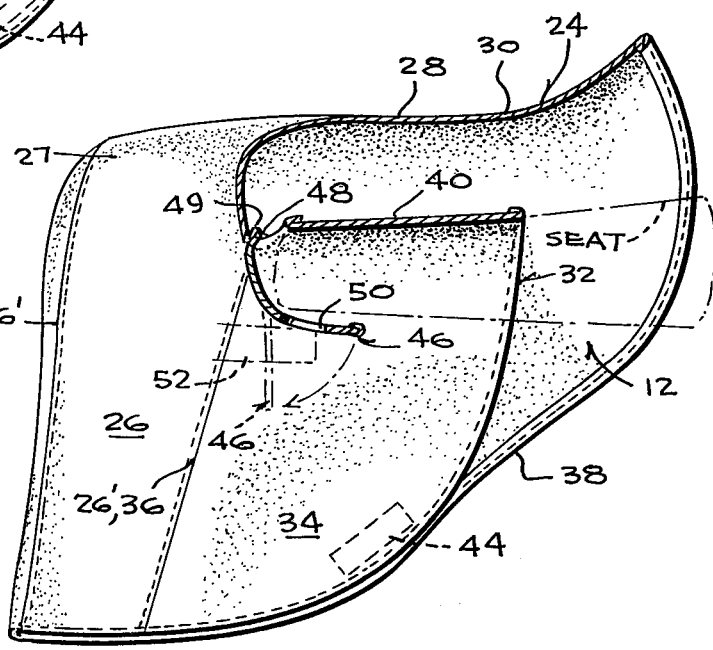
FIG. 5 is a longitudinal cross-sectional view of the apron taken through the crotch and seat area of the apron.
Figure 6:
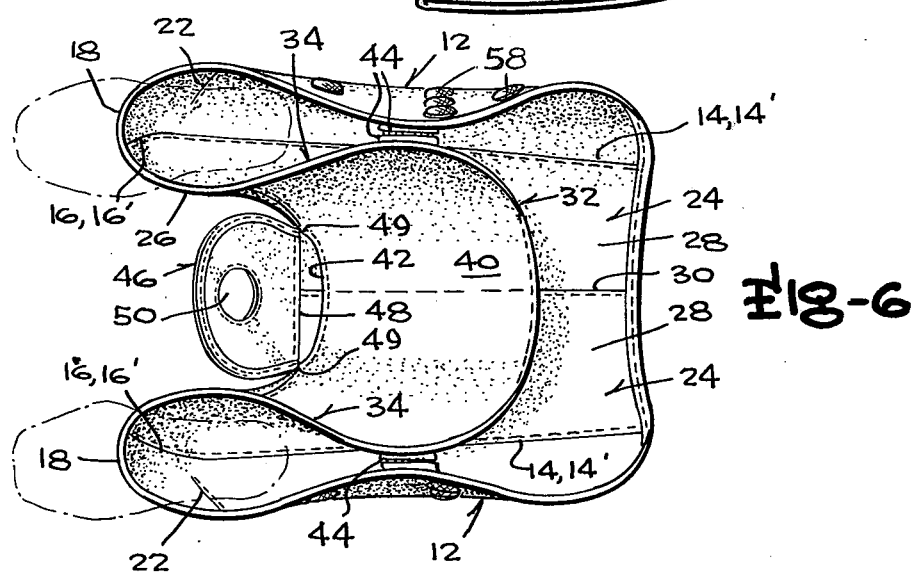
FIG. 6 is a bottom plan view of the chap-apron showing the leg flap portions fastened together.

To facilitate a relatively fixed attachment of the chap-apron to the vehicle, one practical manner has been the utilization of a separate flap member 46 affixed in an integral or unitary manner to the body of the apron in the crotch area. The flap 46 is shown of generally curvalinear form but may be of any suitable outline. One generally linear side 48, or each of the opposite ends 49, 49 thereof, is very securely attached to the assembled apron body, as by heavily reinforced stiching, rivets or other suitable joining means. The flap 46 in one form is preferably provided with an aperture 50 to facilitate placement of the flap over the free end of a frame member 52, shown dotted in FIG. 5. Such frame members 52 are provided as an integral part of certain motorcycles, and are usually well concealed beneath the vehicle seat means. The frame member is accessible for this intended use usually by at least temporarily removing the seat means. Certain cycles have seat means which may have hinge-type attaching means enabling easy access to such a frame member easier than in other vehicles. Locking of the seat in the in-use position is also contemplated, if necessary.

alternative Alternative the aforedescribed flap form, it is contemplated that the flap proper could be cut out of the medial portion 40 of panel 32, and the edges and fold area thereof being heavily reenforced as by stitching and/or otherwise to reduce any tendency to rip away from the apron body attendant either accidental rough handling or intentional attempts to steal the apron. In this regard metallic woven wire seams or other suitable reenforcing members (not shown) may be integrally embodied and used as part of an anchorage for attaching the apron to the vehicle. Where the flap 46 might be cut out of the medial portion 40, it is also contemplated that the remainder of portion 40 may be reenforced by stitching on an auxiliary layer of material. This is proposed because it is this medial portion which in use overlays the vehicle seat, usually being layed or tucked beneath and sat upon by the vehicle operator.

FIG. 7 depicts a still further alternative arrangement of the flap means, wherein the flap 46' is provided with a belt or heavy duty tie strap means 54. Tie strap means 54 may pass freely through reenforced slots 56 formed in flap 46', or it may comprise fixedly attached tie straps. The strap means may further include hook members to facilitate attachment to certain parts of the vehicle frame, seat and the like. The strap means enable the apron to be relatively well secured to the vehicle, particularly if they embody a woven metallic body beneath the weatherproof fabric covering, and if further locked thereon.

While one area of attachment to the vehicle has been shown and described as being adjacent the crotch or seat area, it is further contemplated that other areas of attachment may be evolved such as along other portions of the panel 32 and the like. FIG. 8 is representative of such a contemplated embodiment wherein a modified form of the elongated saddle panel 32' is provided with a least one stretchable insert piece 33 in the medial portion 40'. The stretchable insert piece 33 may be of an elastictype material and is preferably medially disposed to permit lateral stretching of the saddle panel 32'. In lieu of one centrally disposed stretchable insert, one or more laterally disposed elastic pieces could be utilized. On the under side of the medial portion 40' there are provided opposed rows of hook members 35 disposed to be engageable beneath the lower opposite edges of the cycle's saddle or seat responsive to lateral stretching of the medial portion 40'. It is understood that said hook members may be attachable to any other suitable lateral portions of the saddle.

A further refinement for the foregoing modified embodiment would be to provide a pair of flexible complemental strap members 37 secured generally adjacent the rows of hooks 35, and adapted to be suitably fastened together beneath the saddle. Additional variations of this modification contemplate hooks and/or auxiliary complemental strap means 39 along the inside faces adjacent the lower front seam-forming edges 36'. Such strap means 39 could be interconnected through or to a lower portion of the vehicle on which the apron is being used. It is to be understood that when using the embodiment of FIG. 8, the aforedescribed crotch flap 46 preferably would be omitted.

As a safety feature, any suitable form of reflector means may be applied to the various panel components such as reflectors 58, or reflector tape, as shown in some of the drawing figures. A more sophisticated version of this safety feature is the comtemplated use of at least the full outer flap panels 12 which are made of a luminous or other similar light-emitting or light reflecting material, in lieu of applying the aforementioned reflectors 58 or similar tape strips.

Also it is contemplated that the chap-apron can be made of a one piece flexible plastic-like film, or composed of a plurality of light-weight panels having different characteristics and configurations from those in the foregoing described practical embodiment.

It is believed that the use of the described chap-apron is apparent from the illustrations and foregoing descriptions. However, a supplemental review of the use will be set forth.

The apron article, being relatively flexible and compactly foldable, can be readily carried either in a separate cover envelope or within the storage compartment or saddle bags of any of these contemplated vehicles, so that it is available as conditions may dictate.

To use the apron, it is unfolded and laid out generally flat across the cycle tank or mid-portion, with the panel portion 32 overlaying the seat generally in the shape or condition as shown in FIG. 2. In some instances the medial portion 40 of the panel 32 may be tucked beneath the saddle means either with or without the use of the flap 46, although a preferred manner is to have portion 40 overlay the seat as to be sat upon by the operator-user. Thus far, the apron is loosely draped over the vehicle with the lap and outer leg panel portions laying reversely forwardly and out of way to enable the operator to freely straddle mount the vehicle. This also would be true in use of the form of FIG. 8 wherein the middle portion 40' is laterally stretched over the seat to facilitate engagement of the hook members 35 beneath the lower outer edges of the seat. The use of the strap members 37 or 39 would be optional. The stretchable characteristic attributable to use of the FIG. 8 modified embodiment for the saddle panel 32', will result in the added advantage of being able to adjustably position the apron member on the vehicle, within certain limits, to better satisfy individual comfort and/or preferences.

After the operator positions himself in the general operating position and preferably has the vehicle motor operating, he then draws the flexible material apron back toward and over his lap and legs to a comfortable use position, such as shown in FIG. 1. It is understood that the aprons of this invention should be proportioned so as to preferably leave the operator's feet unencumbered and free to properly control his vehicle at all times. By the provision of the preferred Velcro type fasteners on the inner and outer leg flaps or panel portions, these flaps may be selectively positively interconnected to reduce the likelihood of apron flappinng and to reduce potential draft or access by the various atmospheric elements. One or more areas of such fastening may be provided, but they are of limited extent so as to enable quick release thereof whether attendant normal or emergency use situations.

It is apparent from the foregoing that a novel and more universal chap-type protective apron has been evolved which achieves all of the objectives and advantages set forth in the foregoing specification. The basic chap style apron of this invention is estimated to be applicable to perhaps as much as 85% of the present street variety stock type cycles and related vehicles. Because the protectiveness of this apron is primarily for against the weather elements, and would be of relatively little help during a skid or spill since the object therein would be for the rider to dismount. Nevertheless, in the event dismounting was not effected or not feasible, the durable material of which at least certain preferred apron forms are fabricated will provide a certain degree of protection for the lower portions of the body.

While certain practical embodiments of the present invention have been illustrated and described in detail, still other variations and alterations may be made by those skilled in the art without necessarily departing from the inventive spirit and scope as defined in the appended claims.

What is claimed is:

1. A protective article of apparel for use by riders of and in association with wheeled and other type of mechanized vehicles such as motorcycles, snowmobiles and the like having a seat for the operator, said article comprising
   a generally chap-style apron of flexible material including a medial lap-covering portion interconnecting a pair of generally knee-contoured, and knee-and-outer leg-covering portions;

said article further including a crotch portion, a partial seat-engaging portion adapted to overlay the vehicle seat and to be sat upon by the rider when in use, a separate flexible flap member unitarily and fixedly connected thereto in said crotch portion and seat area, said flap member embodying means for connecting said chap-style apron via said flap member in a positive manner to said vehicle; and said article being of a size and shape adaptable to overlay and essentially protectively enclose the user's legs and lap when the user is in a generally normal seated position upon the vehicle.

2. An article as defined in claim 1 for use with vehicles having removably attached seat means and a generally seat-hidden frame member having a reenforced aperture therein to be applied over said free end of the frame member and beneath said seat to facilitate positive but selectively detachable connection and retention of the article to the vehicle.

3. An article as defined in claim 1 wherein said flap-embodied means for connecting said apron article to said vehicle includes tie or belt means in association therewith for fastening to a portion of said vehicle.

4. A protective article of apparel for use by riders of and in association with wheeled and other type of mechanized vehicles such as motorcyles, snowmobiles and the like having a seat for the operator, said article comprising
   a. a generally chap-style apron of flexible material including a medial lap-covering portion interconnecting a pair of generally knee-contoured and knee-and-outer leg-covering portions;
   b. a flexible central panel member having a medial portion adapted to overlay said vehicle seat, and including oppositely elongated portions serving as opposite inner leg-covering portions;
   c. apron-attaching means for securing removable attachment of said apron article to said vehicle, including hook means on an under, seat-engaging surface, said hook means disposed in a generally opposed manner generally at opposite sides of said medial portion of said flexible central panel member, and adaptable for engagement beneath laterally disposed portions of said vehicle seat;
   d. said apron-attaching means further including flexible strap means attached to said under, seat-engaging surface generally adjacent said hook means, said strap means adapted to selectively interconnect beneath said seat the opposite sides of said medial portion of said flexible central panel member; and
   e. said article being of a size and shape adaptable to overlay and essentially protectively enclose the user's legs and lap when the user is in a generally normal seated position upon the vehicle.

5. An article as defined in claim 4 wherein said flexible central panel member in its medial portion including at least one resiliently expandable and contractable area between said opposed hook means.

6. An article as defined in claim 4, wherein said flexible strap means of paragraph (d) include two strap assemblies, one (37) being as said connected generally adjacent said hook means, and the other strap assembly (39) spaced apart therefrom to traverse a lower part of said vehicle and connectable with opposite lower portions of said inner leg-covering portions thereof.

7. A protective article of apparel for use by riders of and in association with wheeled and other type of mechanized vehicles such as motorcycles, snowmobiles and the like having a seat for the operator and handlebar and steering means spaced from said seat by tank and/or frame means, said article comprising
   a. a generally chap-style apron of flexible material including a medial lap-covering portion interconnecting a pair of generally knee-contoured, and knee-and-outer leg-covering portions;
   b. said article being of a shape and size which excludes covering any substantial part of said vehicle between said seat and said handle bar and steering means when said article is in operative protective use associated with the vehicle operator;
   c. said article being sized and shaped so as to be adaptable to overlay and essentially protectively enclose the user's lap, thighs, knees, and a substantial major part of the lower legs when the user is in a generally normal seated position upon the vehicle; and
   d. said article including florescent means on at least certain portions of said apron article to better illuminate said article during night use.

8. A protective article of apparel for use by riders of and in association with wheeled and other type of mechanized vehicles such as motorcycles, snowmobiles and the like having a seat for the operator and handlebar and steering means spaced from said seat by tank and/or frame means, said article comprising
   a. a generally chap-style apron of flexible material including a medial lap-covering portion interconnecting a pair of generally knee-contoured, and knee-and-outer leg-covering portions;
   b. said article being of a shape and size which excludes covering any substantial part of said vehicle between said seat and said handle bar and steering means when said article is in operative protective use associated with the vehicle operator;
   c. said article being sized and shaped so as to be adaptable to overlay and essentially protectively enclose the user's lap, thighs, knees, and a substantial major part of the lower legs when the user is in a generally normal seated position upon the vehicle; and
   d. said article including at least some light reflector means on each outer leg covering portion.

9. A protective article of apparel for use by riders of and in association with wheeled and other type of mechanized vehicles such as motorcycles, snowmobiles and the like having a seat for the operator and handlebar and steering means spaced from said seat by tank and/or frame means, said article comprising
   a. a generally chap-style apron of flexible material including a medial lap-covering portion interconnecting a pair of generally knee-contoured, and knee-and-outer leg-covering portions;
   b. said article being of a shape and size which excludes covering any substantial part of said vehicle between said seat and said handle bar and steering means when said article is in operative protective use associated with the vehicle operator;
   c. said article being sized and shaped so as to be adaptable to overlay and essentially protectively enclose the user's lap, thighs, knees, and a substantial major part of the lower legs when the user is in a generally normal seated position upon the vehicle; and d. wherein said apron is fabricated to include an outer surface of durable abrasion-resistant material having weatherproof and wind-proof characteristics.

10. A protective article of apparel for use by riders of and in association with wheeled and other type of mechanized vehicles such as motorcycles, snowmobiles and the like having a seat for the operator and handlebar and steering means spaced from said seat by tank and/or frame means, said article comprising a. a generally chap-style apron of flexible material including a medial lap-covering portion interconnecting a pair of generally knee-contoured, and knee-and-outer leg-covering portions;

b. said apron including two pair of essentially identical but opposite hand panel elements generally symetrically secured together about a longitudinal center line by plural joinder seam means, one pair being a central pair of elements having a joinder seam constituting said centerline and collectively in part forming said lap-covering portion, said other pair connected to said first pair by joinder seams equally spaced from said centerline and so as to form at least part of said knee-contoured portions and also said outer leg-covering areas;

c. said article being of a shape and size which excludes covering any substantial part of said vehicle between said seat and said handle bar and steering means when said article is in operative protective use associated with the vehicle operator; and d. said article being sized and shaped so as to be adaptable to overlay and essentially protectively enclose the user's lap, thighs, knees, and a substantial major part of the lower legs when the user is in a generally normal seated position upon the vehicle.

11. An article as defined in claim 10, also including a further flexible component serving both as a vehicle seat overlaying member and also as partial crotch and opposite inner leg-covering flap-portions, said further flexible component being integrally connected to said previously described panel elements at least partially forwardly adjacent and substantially coextensive with said outer leg-covering areas.

12. A protective article of apparel for use by riders of and in association with wheeled and other type of mechanized vehicles such as motorcycles, snowmobiles and the like having a seat for the operator and handlebar and steering means spaced from said seat by tank and/or frame means, said article comprising a. a generally chap-style apron of flexible material including a medial lap-covering portion interconnecting a pair of generally knee-contoured, and knee-and-outer leg-covering portions;

b. said article being of a shape and size which excludes covering any substantial part of said vehicle between said seat and said handle bar and steering means when said article is in operative protective use associated with the vehicle operator;

c. said article being sized and shaped so as to be adaptable to overlay and essentially protectively enclose the user's lap, thighs, knees, and a substantial major part of the lower legs when the user is in a generally normal seated position upon the vehicle; and d. further including a crotch portion, and a partial seat-engaging portion adapted to overlay the vehicle seat and to be sat upon by the rider when using said apparel article.

13. An article as defined in cliam 12, wherein said partial seat-engaging portion also includes a pair of inner leg protective flap portions unitarily formed therewith and substantially coextensive with said outer leg-covering areas.

14. An article as defined in claim 13, wherein said outer leg covering portions and inner leg protective flap portions include cooperative quick-attachable and detachable fastener means to facilitate both initial quick attachment and quick detachment of said outer and inner leg portions to and from one another around the operator's legs, said quick detachment being responsive to removal pressure exertable by the operator's legs against said fastener means.

15. An article as defined in claim 14, wherein said quick attachment and detachment fastener means are of Velcro-type patches of a limited extent near peripheral margin areas of said inner and outer leg flap portions.

16. A protective article of apparel for use by riders of and in association with wheeled and other type of mechanized vehicles such as motorcycles, snowmobiles and the like having a seat for the operator, said article comprising a generally chap-style apron of flexible material including a medial lap-covering portion interconnecting a pair of generally knee-contoured, and knee-and-outer leg-covering portions; said apron integrally also including a flexible central under panel member having a medial portion adapted to serve as a vehicle-seat-overlaying member, and further having oppositely elongated portions depending on opposite sides a substantial distance and serving as opposite inner leg-covering portions connected with said outer leg-covering portions; and means for attaching said apron article to said vehicle including hook means on an under surface constituting a seat-engaging surface of said flexible central under panel member; said hook means including hook members disposed in a generally opposed manner generally at opposite sides of said medial portion of said flexible central panel member and adaptable for engagement beneath laterally disposed portions of said vehicle seat; and said article being of a shape and size adaptable to overlay and essentially protectively enclose the user's legs and lap when the user is in a generally normal seated position upon the vehicle.

* * * * *